(12) United States Patent
Garimella et al.

(10) Patent No.: US 9,834,070 B2
(45) Date of Patent: Dec. 5, 2017

(54) VEHICLE DOOR

(71) Applicants: MAGNA INTERNATIONAL INC., Aurora (CA); Venugopal Garimella, Commerce Township, MI (US); Mari Chellman, Berkley, MI (US); John Johnson, Columbus, MI (US); Alexander Zak, Troy, MI (US)

(72) Inventors: Venugopal Garimella, Commerce Township, MI (US); Mari Chellman, Berkley, MI (US); John Johnson, Columbus, MI (US); Alexander Zak, Troy, MI (US)

(73) Assignee: Magna International Inc., Aurora, Ontario (CA)

( * ) Notice: Subject to any disclaimer, the term of this patent is extended or adjusted under 35 U.S.C. 154(b) by 0 days.

(21) Appl. No.: 14/416,824

(22) PCT Filed: Jul. 23, 2013

(86) PCT No.: PCT/US2013/051639
§ 371 (c)(1),
(2) Date: Jan. 23, 2015

(87) PCT Pub. No.: WO2014/018511
PCT Pub. Date: Jan. 30, 2014

(65) Prior Publication Data
US 2015/0202950 A1    Jul. 23, 2015

Related U.S. Application Data

(60) Provisional application No. 61/674,547, filed on Jul. 23, 2012.

(51) Int. Cl.
*B60J 5/04* (2006.01)
*B23P 19/04* (2006.01)

(52) U.S. Cl.
CPC .............. *B60J 5/0463* (2013.01); *B23P 19/04* (2013.01); *B60J 5/0402* (2013.01); *B60J 5/047* (2013.01); *B60J 5/048* (2013.01); *B60J 5/0419* (2013.01); *B60J 5/0443* (2013.01); *B60J 5/0483* (2013.01);
(Continued)

(58) Field of Classification Search
CPC ......... B60J 5/042–5/0433; B60J 5/0463; B60J 5/0402; B60J 5/0444; B23P 19/04
USPC ..... 46/502; 296/187.12, 146.1, 146.2, 146.5, 296/146.6
See application file for complete search history.

(56) References Cited

U.S. PATENT DOCUMENTS 4,090,734 A * 5/1978 Inami .................... B60J 5/0437
296/146.6
4,684,166 A * 8/1987 Kanodia ................ B60J 5/0447
296/146.6
(Continued)

*Primary Examiner* — Justin Rephann
(74) *Attorney, Agent, or Firm* — Dickinson Wright PLLC

(57) ABSTRACT

A door assembly for a vehicle is provided. The door assembly includes an inner panel and an outer panel which are joined together to define a central space therebetween. The central space has a front which faces towards the front of a vehicle and a back which faces towards a back of the vehicle. Both the inner and outer panels are made of aluminum, and at least one reinforcement beam made of steel is disposed in the central space between the aluminum inner and outer panels to provide the door assembly with increased impact resistance.

11 Claims, 4 Drawing Sheets

(52) U.S. Cl.
CPC ....... *B60J 5/0484* (2013.01); *Y10T 29/49622* (2015.01)

(56) References Cited

U.S. PATENT DOCUMENTS

| | | | | |
|---|---|---|---|---|
| 4,861,097 A * | 8/1989 | Wycech | ................ | B60J 5/0437 296/146.6 |
| 5,094,034 A * | 3/1992 | Freeman | ................ | B60J 5/0437 296/146.6 |
| 5,232,261 A * | 8/1993 | Kuroda | ................ | B60J 5/0444 296/146.4 |
| 5,536,060 A | 7/1996 | Rashid et al. | | |
| 5,813,719 A * | 9/1998 | Kowalski | ................ | B60J 5/0444 296/146.6 |
| 5,868,456 A * | 2/1999 | Kowalski | ................ | B60J 5/0444 296/146.6 |
| 6,015,182 A * | 1/2000 | Weissert | ................ | B60J 5/0404 29/522.1 |
| 6,020,039 A * | 2/2000 | Cline | ................ | B60J 5/0444 296/146.6 |
| 6,454,884 B1 * | 9/2002 | McNulty | ................ | B60J 5/0437 148/520 |
| 6,550,846 B1 * | 4/2003 | Chappuis | ................ | B60J 5/0427 296/146.5 |
| 6,575,525 B2 * | 6/2003 | Traister | ................ | B60J 5/0433 296/146.6 |
| 6,622,450 B2 * | 9/2003 | Nees | ................ | B60J 5/0444 296/146.6 |
| 6,968,650 B2 * | 11/2005 | Seksaria | ................ | B60J 5/0425 49/360 |
| 7,086,686 B2 * | 8/2006 | Bullmann | ................ | B60J 5/0444 188/377 |
| 7,125,067 B2 * | 10/2006 | Bonnett | ................ | B60J 5/0416 296/146.5 |
| 7,270,364 B1 * | 9/2007 | Kim | ................ | B60J 5/0433 296/146.6 |
| 8,177,285 B2 | 5/2012 | Ishitobi et al. | | |
| 8,727,421 B2 * | 5/2014 | Cohoon | ................ | B60J 5/0425 296/146.6 |
| 8,857,891 B2 * | 10/2014 | Jeon | ................ | B60J 5/0455 296/146.6 |
| 8,943,753 B2 * | 2/2015 | Okada | ................ | B60J 5/0411 296/146.5 |
| 2002/0046505 A1 | 4/2002 | Seksaria et al. | | |
| 2002/0078631 A1 * | 6/2002 | Hock | ................ | B60J 5/0402 49/502 |
| 2003/0189357 A1 * | 10/2003 | Patberg | ................ | B60J 5/0416 296/146.6 |
| 2005/0001448 A1 | 1/2005 | Omori et al. | | |
| 2005/0077752 A1 * | 4/2005 | Albers | ................ | B60J 5/0447 296/146.6 |
| 2005/0188647 A1 | 9/2005 | Krajewski et al. | | |
| 2005/0212324 A1 * | 9/2005 | Mittermeier | ................ | B60J 5/0406 296/146.5 |
| 2007/0001483 A1 * | 1/2007 | Uchida | ................ | B21C 37/155 296/187.12 |
| 2007/0039245 A1 * | 2/2007 | Buchta | ................ | B60J 5/0416 49/502 |
| 2007/0222257 A1 * | 9/2007 | Flendrig | ................ | B60J 5/0405 296/146.6 |
| 2008/0007087 A1 * | 1/2008 | Endo | ................ | B60J 5/0426 296/187.01 |
| 2009/0015035 A1 * | 1/2009 | Baumgart | ................ | B60J 5/0416 296/146.2 |
| 2009/0026795 A1 * | 1/2009 | Tate | ................ | B60J 5/0437 296/146.6 |
| 2009/0051193 A1 * | 2/2009 | Hernandez | ................ | B60J 5/0416 296/146.2 |
| 2009/0056230 A1 * | 3/2009 | Flendrig | ................ | B60J 5/0405 49/502 |
| 2010/0052360 A1 * | 3/2010 | Hsu | ................ | B60J 5/0437 296/146.6 |
| 2010/0242284 A1 * | 9/2010 | Danaj | ................ | B23K 20/06 29/897.2 |
| 2011/0016665 A1 * | 1/2011 | Ng | ................ | E05C 17/203 16/85 |
| 2011/0101733 A1 * | 5/2011 | Anderson | ................ | B60J 5/042 296/187.12 |
| 2011/0113697 A1 * | 5/2011 | Sachdev | ................ | B60J 5/0425 49/502 |
| 2013/0057018 A1 * | 3/2013 | Reese | ................ | B29C 45/1418 296/146.6 |

* cited by examiner

VEHICLE DOOR

CROSS-REFERENCE TO RELATED APPLICATIONS

This U.S. National Stage Patent Application claims the benefit of International Application Serial No. PCT/US2013/051639 filed Jul. 23, 2013, entitled "Vehicle Door" which claims priority to U.S. Provisional Patent Application Ser. No. 61/674,547, entitled "Vehicle Door", filed Jul. 23, 2012, the entire disclosures of the applications being considered part of the disclosure of this application, and hereby incorporated by reference.

BACKGROUND OF THE INVENTION

1. Field of the Invention

The present invention is generally related to vehicle doors and more particularly to vehicle door assemblies that include components made of different materials.

2. Related Art

Vehicle doors typically include an outer panel, an inner panel spaced laterally from the outer panel to provide a central space (also known as a window receiving well) and a window frame secured to the outer panel. Various components, such as a latch mechanism and a window channel, are secured to at least one of the inner and outer panels within the central space. Historically, all of these components, including the inner and outer panels, were formed of steel. However, more recently, in order to improve a vehicle's fuel economy and performance, some vehicle door manufacturers have used aluminum rather than steel to form the above-listed components. Although aluminum is generally lighter than steel, there are certain drawbacks to producing doors substantially entirely of aluminum. For example, a greater volume of aluminum may be required to provide an all-aluminum door with sufficient resistance to side impacts.

One known bi-metallic door assembly includes a large metal plate which is sandwiched between aluminum inner and outer panels. However, the weight savings from this approach are limited and this approach may be too costly for some mass manufacturing applications.

There is a significant and continuing need for a cost effective approach to reduce the weight of door assemblies without compromising their side impact resistance.

SUMMARY OF THE INVENTION

One aspect of the present invention provides for a door assembly for a vehicle. The door assembly includes an inner panel which is made of aluminum and an outer panel which is also made of aluminum. The aluminum inner and outer panels are joined together to define a central space between the inner and outer panels, and the central space has a front which faces towards the front of a vehicle and a back which faces towards a back of a vehicle. The door assembly also includes at least one reinforcement beam which is made of steel and extends lengthwise between the front and back of the central space between the aluminum inner and outer panels to provide improved impact resistance to the door assembly. The door assembly according to this aspect of the present invention is advantageous because it provides a cost effective weight or mass reduction without compromising the impact resistance of the door assembly.

According to another aspect of the present invention, in combination, all of the metal components attached to the aluminum inner and/or outer panels and located in the central space between said aluminum inner and outer panels are greater than 35% steel by mass and less than 65% aluminum by mass. Because the metal components are relatively smaller by volume than the aluminum inner and outer panels, the additional mass to the door assembly from the steel components in the central space is not significant.

BRIEF DESCRIPTION OF THE DRAWINGS

These and other features and advantages of the present invention will be readily appreciated, as the same becomes better understood by reference to the following detailed description when considered in connection with the accompanying drawings wherein.

DESCRIPTION OF THE ENABLING EMBODIMENT

Figure 3:
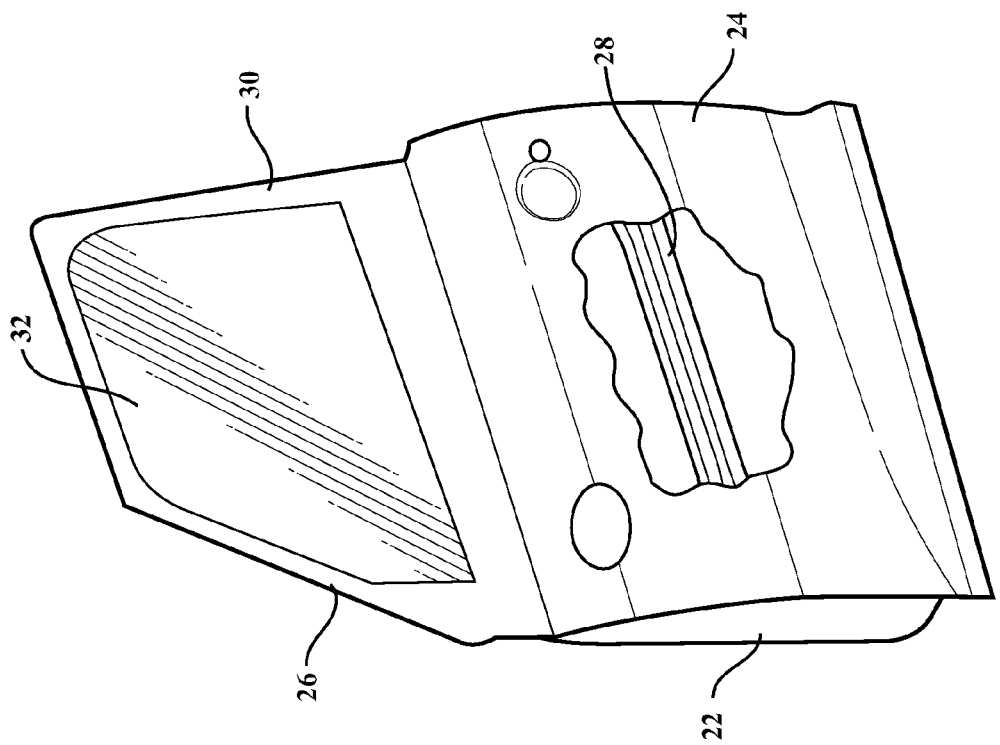
FIG. 3 is a fragmentary view of the first exemplary embodiment of the door assembly.
Figure 1:
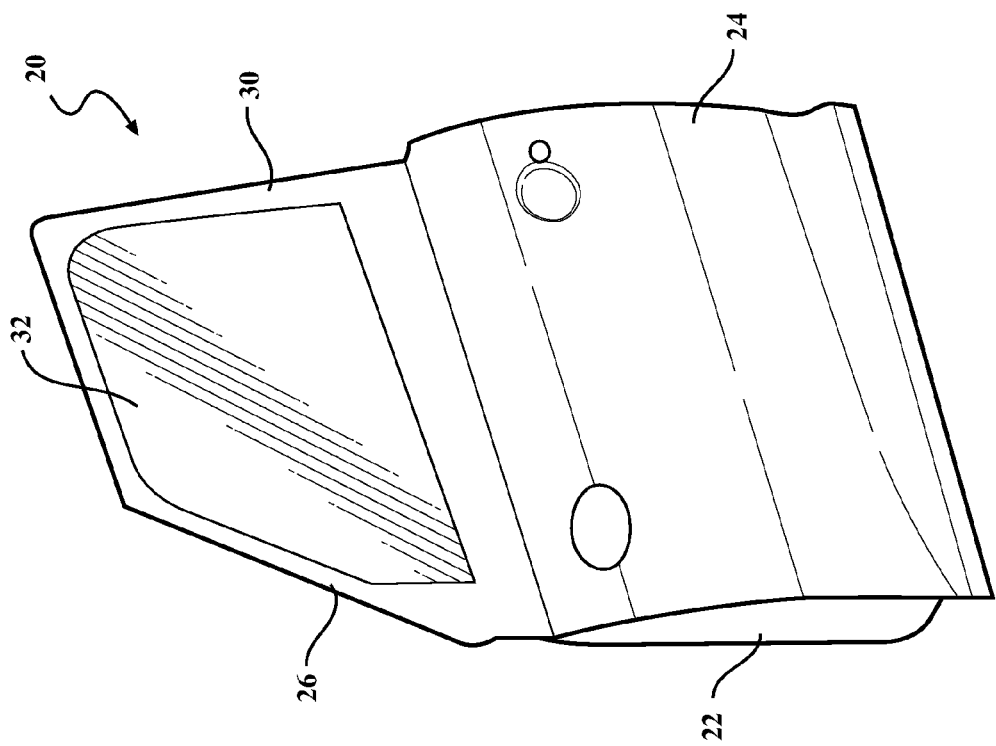
FIG. 1 is an elevation and perspective view of a first exemplary embodiment of a door assembly.
Figure 2:
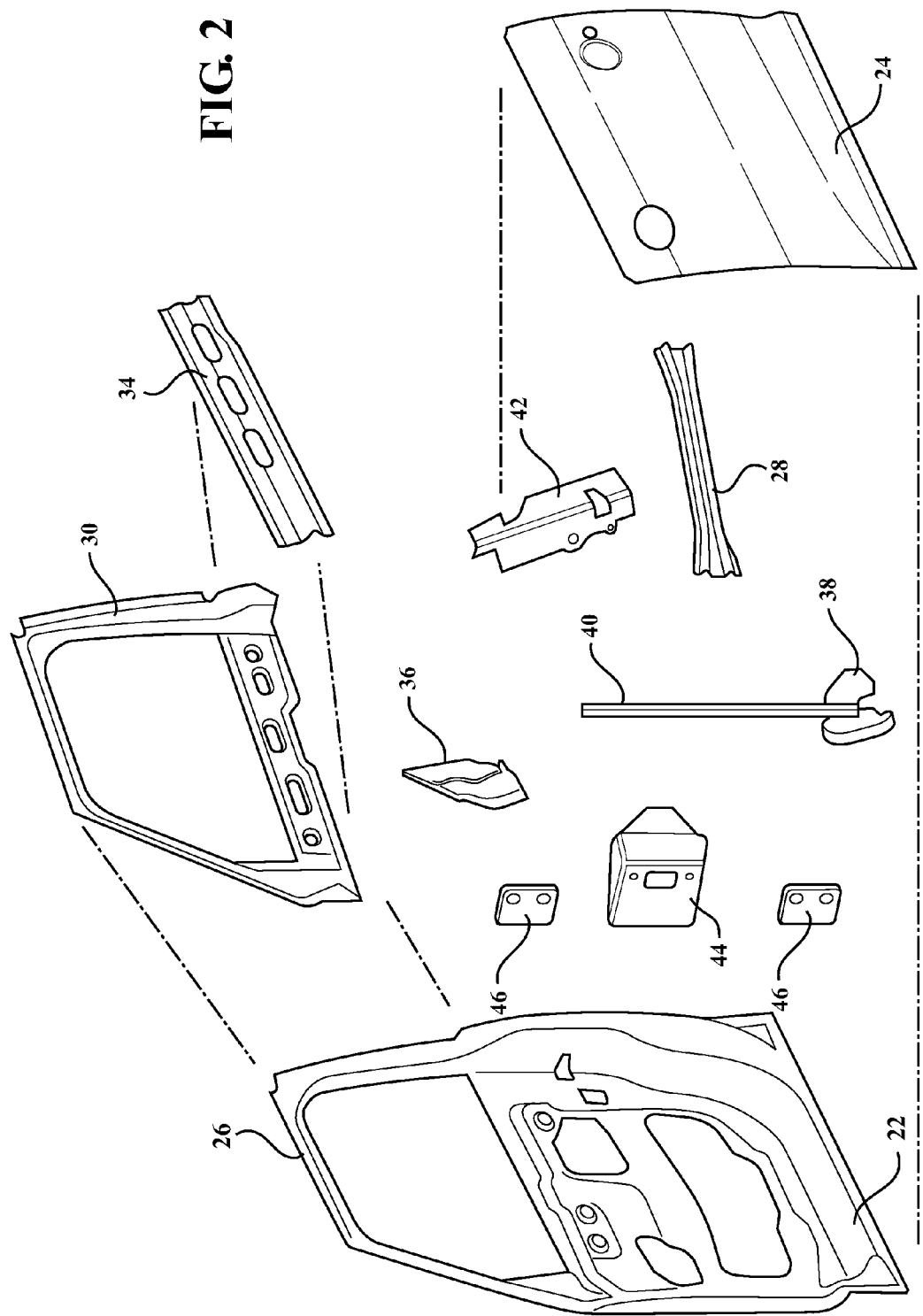
FIG. 2 is an exploded view of the first exemplary embodiment of the door assembly.
Figure 4:
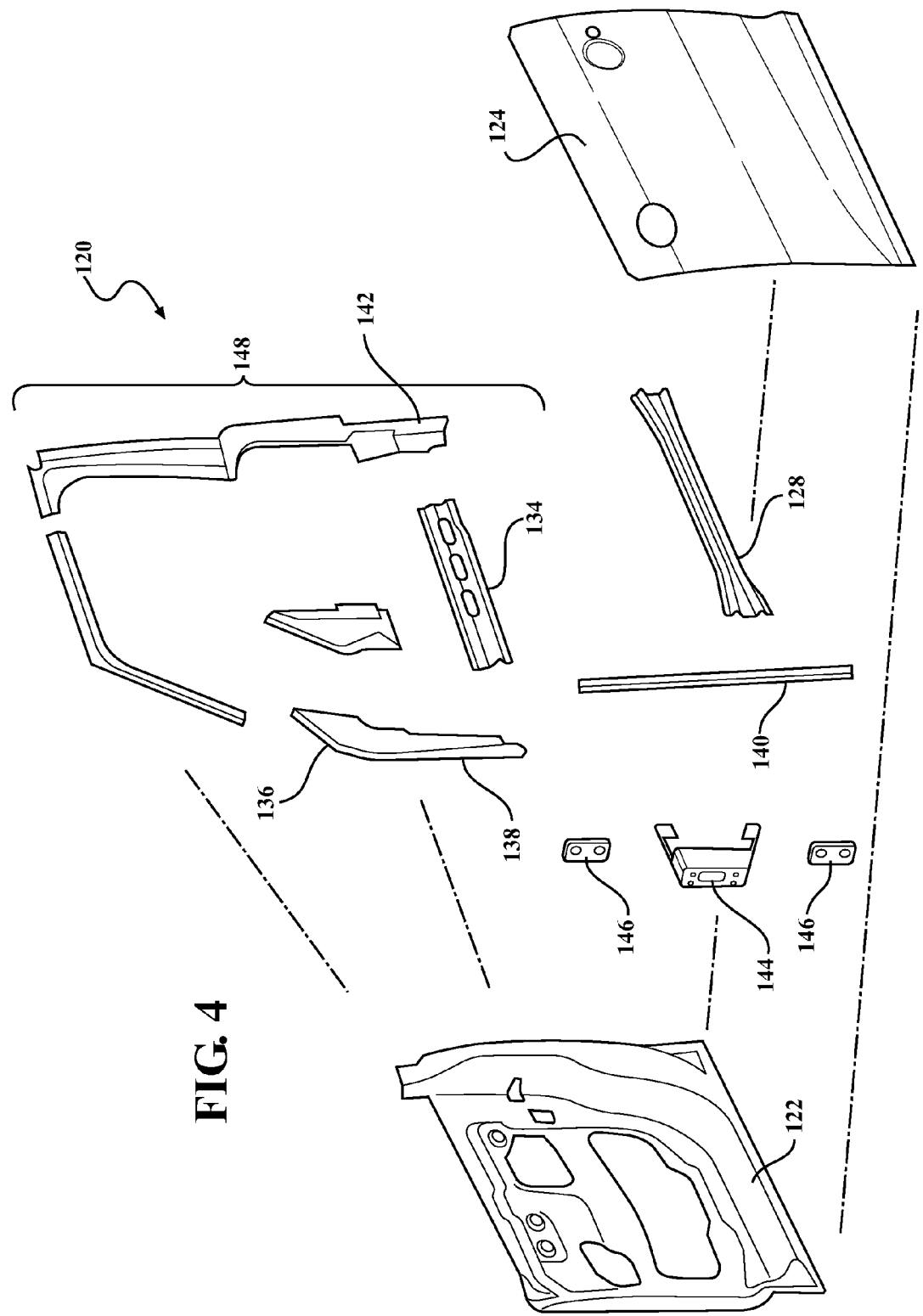
FIG. 4 is an exploded view of a second exemplary embodiment of the door assembly.
Figure 5:
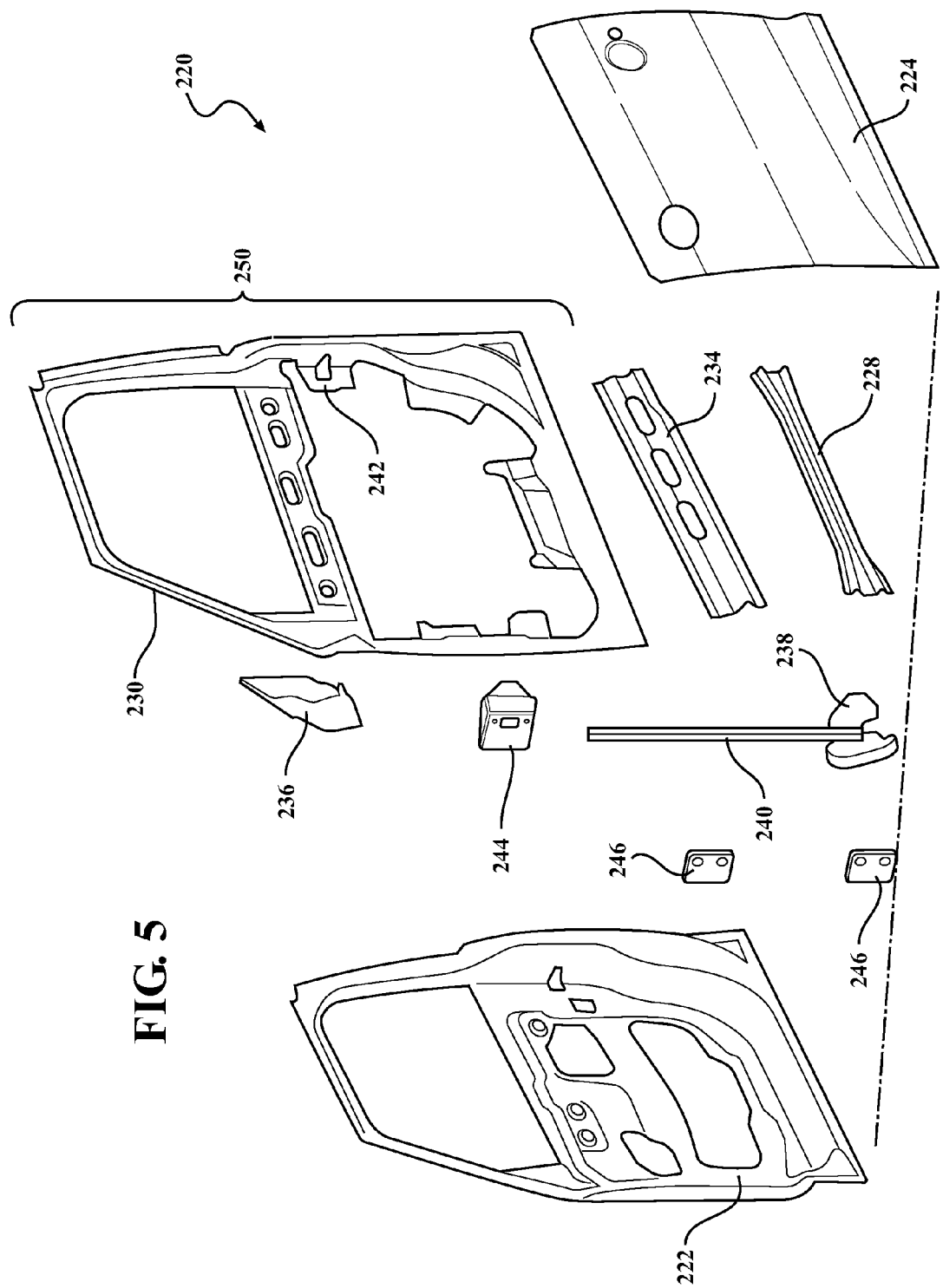
FIG. 5 is an exploded view of a third exemplary embodiment of the door assembly.

Referring to the Figures, wherein like numerals represent corresponding parts throughout the several views, a first exemplary embodiment of a door assembly 20 for a vehicle is generally shown in FIGS. 1-3, a second exemplary embodiment of a door assembly 120 for a vehicle (not shown) is generally shown in FIG. 4 and a third exemplary embodiment of a door assembly 220 for a vehicle is generally shown in FIG. 5. As discussed in further detail below, each of the exemplary door assemblies 20, 120, 220 includes both aluminum components and steel components. This provides the door assemblies 20, 120, 220 with weight or mass savings without compromising their side impact resistance while also reinforcing certain portions of the door assemblies 20, 120, 220 that are particularly susceptible to damage. Additionally, the use of steel for certain components of the door assemblies 20, 120, 220 may provide for cost savings as compared to all-aluminum door assemblies. Even further, the use of steel for certain portions also allows for a reduction in the thickness of the aluminum components without compromising the structural integrity of the door assemblies 20, 120, 220. As such, the weight and cost effectiveness of the door assemblies 20, 120, 220 are both optimized without compromising their structural integrities and resistance to side impact forces. As used herein, the terms aluminum and steel are meant to include these metals in their pure forms as well as alloys thereof.

The door assemblies 20, 120, 220 of the exemplary embodiments are front driver-side doors of passenger vehicles. However, the door assemblies 20, 120, 220 could alternately be configured for use as passenger side or for rear vehicle doors. The door assemblies 20, 120, 220 may also be configured to be applied to the full range of segments of passenger vehicles as well as other types of vehicles including, for example, pick-up trucks, sport utility vehicles, cross-over vehicles, heavy trucks, personal transport vehicles, etc.

An exploded view of the first exemplary embodiment of the door assembly 20 is shown in FIG. 2. The door assembly 20 of this exemplary embodiment has a so-called "frame behind glass" architecture. As shown, the door assembly 20 includes an inner panel 22 and an outer panel 24 which are joined together (see FIGS. 1 and 3) to define a central space having a front which faces towards the front of the vehicle and a back which faces towards the back of the vehicle. The inner and outer panels 22, 24 are made of aluminum. Since these components are by volume the largest components of the door assembly 20, the use of aluminum for these panels 22, 24 allows for significant weight reduction as compared to door assemblies with steel inner and outer panels. In this exemplary embodiment, the inner panel 22 includes a window portion 26 formed integrally therewith, which allows for cost effective mass savings and may also offer better sealing options to the vehicle body (not shown).

The door assembly 20 further includes a reinforcement beam 28 in the form of a door beam 28 which extends lengthwise between the front and the back of the central space between the inner and outer panels 22, 24. In other words, the door beam 28 extends in a lengthwise direction which corresponds to a forward and backward direction of the vehicle. The door beam 28 is made of steel to provide improved side impact reinforcement to the door assembly 20. Specifically, in the event of a side impact collision, the door beam 28 absorbs energy from the impact forces to prevent collapse and failure of the other portions of the entire door assembly 20, thereby protecting any occupants seated in the vehicle.

The door assembly 20 of this exemplary embodiment includes a window frame 30 which is formed as a separate component from the inner and outer panels 22, 24 and is attached to at least one of the panels 22, 24. The window frame 30 and the window portion 26 of the aluminum inner panel 22 together receive a window 32 (see FIGS. 1 and 3) when it is in a "full up" position. In the exemplary embodiment, the window frame 30 is formed of one integral piece of material. However, it should be appreciated that the window frame 30 could alternately be formed of multiple pieces which are formed separately and subsequently joined together. A belt reinforcement piece 34 is attached to the lower portion of the window frame 30 to reinforce the area where the window frame 30 is attached to one of the inner and outer panels 22, 24.

Within the central space between the inner and outer panels 22, 24, the door assembly 20 includes an upper and lower hinge reinforcement pieces 36, 38 which are attached to at least one of the inner and outer panels 22, 24. The upper and lower hinge reinforcement pieces 36, 38 are attached to and provide reinforcement to one or both of the inner and outer panels 22, 24 in the areas of the hinges (not shown) which join the door assembly 20 to the vehicle body (not shown). A window channel 40 for guiding movement of the window 32 from the "full up" position to a "partial down" position or a "full down" position is also disposed within the central space between the inner and outer panels 22, 24. In the first exemplary embodiment, the window channel 40 is coupled to one of the panels 22, 24 through the lower hinge reinforcement piece 38.

A latch reinforcement piece 42 and a check link reinforcement piece 44 are also located within the central space between the inner and outer panels 22, 24 and joined to one of the panels 22, 24 for providing reinforcement in the area of a latch mechanism (not shown) and a check link (not shown) respectively. Even further, a pair of vertically spaced stud plate assemblies 46 are also attached to either the inner or the outer panel 22, 24 and are located within the central space.

In this exemplary embodiment, the window frame 30; the upper and lower hinge reinforcement pieces 36, 38; the window channel 40; the check link reinforcement piece 44; the latch reinforcement piece 42; and the stud plate assemblies 46 are all formed of steel. Because these components are relatively small in volume they do not significantly increase the weight or mass of the door assembly 20 but they do provide increased strength to the areas of the inner and outer panels 22, 24 that may be susceptible to damage. Because these components provide reinforcement in areas of the inner and outer panels 22, 24 may be particularly susceptible to damage, the inner and outer door panels 22, 24 may be formed of a thinner piece of aluminum as compared to the inner and outer door panels 22, 24 of all aluminum door assemblies 20. Rather than steel, the at least the upper hinge reinforcement piece 36 may be made out of magnesium. The window frame 30 may also be made of aluminum for additional weight or mass savings.

The combination of all of the metal components attached to at least one of the aluminum inner and outer panels 22, 24 and located in the central space between the inner and outer panels 22, 24 are greater than 35% steel by mass, less than 65% aluminum by mass and less than 5% magnesium by mass. This has been found to provide the door assembly 20 with reduced weight or mass without compromising its side impact resistance.

Each of the aforementioned components of the door assembly 20 is preferably formed separately. Any suitable forming process or combination of processes may be employed for any or all of the components including, for example, stamping, roll-forming, extruding, casting and machining. The door beam 28 is preferably shaped through hot stamping process and then may be heat treated to achieve desired strength and hardness characteristics depending upon the specific application. The various components of the door assembly 20 (including the inner and outer panels 22, 24; the door beam 28; the window frame 30; the belt reinforcement piece 34; the upper and lower hinge reinforcement pieces 36, 38; the window channel 40; the latch reinforcement piece 42; the check link reinforcement piece 44; and the stud plate assemblies 46) may be interconnected with one another through a range of different processes including, for example, welding, brazing, adhesives, rivets, mechanical fasteners, etc.

Referring now to FIG. 4, the second exemplary embodiment of the door assembly 120 is generally shown, wherein like numerals separated by a factor of 100 are used to identify similar features as described above. This embodiment is similar to the above discussed first exemplary embodiment except the door assembly 120 includes a header assembly 148 in place of the window frame 30 and the upper and lower hinge reinforcement pieces 136, 138 are formed as one piece of material which is a part of the header assembly 148 rather than as separate components that are located in the central space between the aluminum inner and outer door panels 122, 124. In this exemplary embodiment, all of the features of the header assembly 148 are formed of steel to provide increased strength to the upper portion of the door assembly 120. Alternately, the components of the header assembly may be formed of aluminum and magnesium rather than of steel.

Referring now to FIG. 5, the third exemplary embodiment of the door assembly 220 is generally shown, wherein like numerals separated by a factor of 200 are used to identify similar features as described above. This exemplary embodiment is similar to the first exemplary embodiment described above except the window frame 30 is built into a mid-plane assembly 250 which includes door inner surround 230, the check link reinforcement piece 244 and the upper hinge reinforcement piece 236. The latch reinforcement 242 is also formed integrally with the steel door inner surround 230. In this embodiment, the aluminum door inner mid panel 222 and steel door inner surround 230 are formed in place of the aluminum inner panel 22 and the window frame 30 of the above-discussed first exemplary embodiment, which provides for increased strength to the door assembly 220.

With reference to the first exemplary embodiment shown in FIGS. 1-3, another aspect of the present invention is a method of making a door assembly 20 for a vehicle. The method of the exemplary embodiment includes the step of preparing an inner panel 22 made of aluminum and an outer panel 24 made of aluminum. The aluminum inner and outer panels 22, 24 may be formed through any suitable process including, for example, stamping, roll-forming, extrusion and casting. The method proceeds with the step of joining the aluminum panels 22, 24 together such that a central space is defined between the panels 22, 24 and wherein the central space has a front and a back. The method continues with the step of joining at least one reinforcement beam 28 made of steel to at least one of the aluminum inner and outer panels 22, 24 in the central space such that the at least one reinforcement beam 28 extends lengthwise between the front and back of the central space for increasing the impact resistance of the door assembly 20.

The method may further include the step of attaching at least one metal component to at least one of the aluminum inner and outer panels 22, 24 and wherein all metal components attached to at least one of the inner and outer panels 22, 24 and located in the central space are greater than 35% steel by mass and less than 65% aluminum by mass.

The method may still further include the step of attaching a window channel 40 made of steel to at least one of the aluminum inner and outer panels 22, 24 in the central space for guiding movement of a window 32 and for providing increased impact resistance to the door assembly 20.

The method may additionally include the step of attaching a window frame 30 made of steel to at least one of the aluminum inner and outer panels 22, 24.

Additionally, the method may include the step of attaching at least one hinge reinforcement piece 36, 38 to at least one of the aluminum inner and outer panels 22, 24 within the central space.

Obviously, many modifications and variations of the present invention are possible in light of the above teachings and may be practiced otherwise than as specifically described while within the scope of the appended claims.

The invention claimed is:

1. A door assembly for a vehicle, comprising:
a door support structure including no more than two panels, said no more than two panels including an inner-most structural panel made of aluminum and an outer-most structural panel made of aluminum;
said aluminum inner-most and outer-most panels being joined together and defining a central space between said aluminum inner and outer panels, said central space having a front and a back;
at least one reinforcement beam made of a single monolithic piece of steel and extending lengthwise between said front and back of said central space between said aluminum inner-most and outer-most panels and fixed with at least one of said inner-most and outer-most panels for providing increased impact resistance to said door assembly;
said at least one reinforcement beam having a circumferentially continuous outer peripheral free edge bounding a volume;
said volume of said at least one steel reinforcement beam being less than a volume of said aluminum inner-most panel and being less than a volume of said aluminum outer-most panel;
a window channel, at least one latch reinforcement piece, and at least one check link reinforcement disposed in said central space between said aluminum inner-most and outer-most panels;
a window frame made of steel and a belt reinforcement piece attached with at least one of said inner-most and outer-most panels; and
said at least one reinforcement beam, said window channel, said at least one latch reinforcement piece, said at least one check link reinforcement, said window frame, and said belt reinforcement piece being, in combination, greater than 35% steel by mass, less than 65% aluminum by mass, and less than 5% magnesium by mass for reinforcing said aluminum inner-most and outer-most panels.

2. The door assembly as set forth in claim 1 wherein said at least one reinforcement beam in said central space between said aluminum inner-most and outer-most panels is a door beam.

3. The door assembly as set forth in claim 1 wherein said at least one hinge reinforcement piece is made of steel and positioned in said central space between said aluminum inner-most and outer-most panels.

4. The door assembly as set forth in claim 1 wherein said at least one latch reinforcement is made of steel and positioned in said central space between said aluminum inner-most and outer-most panels.

5. The door assembly as set forth in claim 1 further including a mid plane assembly made of steel and positioned at least partially in said central space between said aluminum inner-most and outer-most panels.

6. The door assembly as set forth in claim 1 wherein said at least one check link reinforcement piece is made of steel and positioned at least partially in said central space between said aluminum inner-most and outer-most panels.

7. The door assembly as set forth in claim 1 further including a plurality of reinforcement pieces disposed in said central space and each being smaller by volume than said aluminum inner-most panel and smaller by volume than said aluminum outer-most panel.

8. A method of making a door assembly for a vehicle, comprising the steps of:
preparing an inner-most panel made of aluminum and an outer-most panel made of aluminum;
joining said aluminum panels together such that a central space is defined between the panels and the central space has a front and a back to form a door support structure which includes no more panels than the inner-most and outer-most panels;
attaching a window channel, at least one latch reinforcement piece, and at least one check link reinforcement to one of the inner-most and outer-most panels and inside the central space for guiding a window into and out of the central space;
joining at least one reinforcement beam made as a single monolithic piece of steel and having a circumferentially continuous outer peripheral free edge that bounds a volume to at least one of the aluminum inner-most and outer-most panels in the central space such that the at least one reinforcement beam extends lengthwise between the front and back of the central space for increasing the impact resistance of the door assembly, wherein the volume of the steel reinforcement beam is less than a volume of the aluminum inner-most panel and is less than a volume of the aluminum outer-most panel;

fixing a window frame made of steel and a belt reinforcement piece with at least one of the inner-most and outer-most panels; and the at least one reinforcement beam, the window channel, the at least one latch reinforcement piece, the at least one check link reinforcement, the window frame, and the belt reinforcement piece being, in combination, greater than 35% steel by mass, less than 65% aluminum by mass, and less than 5% magnesium by mass for reinforcing the aluminum inner-most and outer-most panels.

9. The method of making a door assembly as set forth in claim 8 further including attaching at least one other metal component to at least one of the aluminum inner-most and outer-most panels and wherein in combination all metal components attached to at least one of the aluminum inner-most and outer-most panels and located in the central space between the aluminum inner-most and outer-most panels are greater than 35% steel by mass and less than 65% aluminum by mass.

10. The method of making a door assembly as set forth in claim 8 further including the step of attaching at least one hinge reinforcement piece to at least one of the aluminum inner-most and outer-most panels within the central space between the aluminum inner-most and outer-most panels.

11. The method of making a door assembly as set forth in claim 8 further including the step of disposing a plurality of reinforcement pieces made of steel between the aluminum inner-most panel and the aluminum outer-most panel, and each of the reinforcement pieces being smaller by volume than the aluminum inner-most panel and smaller by volume than the aluminum outer-most panel.

\* \* \* \* \*